US008849567B2

(12) United States Patent
Gupta et al.

(10) Patent No.: US 8,849,567 B2
(45) Date of Patent: Sep. 30, 2014

(54) GEOGRAPHIC DATA UPDATE BASED ON USER INPUT

(75) Inventors: Manik Gupta, Mountain View, CA (US); Alok Goel, Cupertino, CA (US)

(73) Assignee: Google Inc., Mountain View, CA (US)

( * ) Notice: Subject to any disclaimer, the term of this patent is extended or adjusted under 35 U.S.C. 154(b) by 141 days.

(21) Appl. No.: 13/485,821

(22) Filed: May 31, 2012

(65) Prior Publication Data

US 2013/0325329 A1  Dec. 5, 2013

(51) Int. Cl.
*G01C 21/00* (2006.01)
*G06F 17/30* (2006.01)
*G01C 21/32* (2006.01)

(52) U.S. Cl.
CPC .......... *G01C 21/32* (2013.01); *G06F 17/30241* (2013.01)
USPC ....................................................... 701/450

(58) Field of Classification Search
CPC ................................................. G06F 17/33041
USPC ........... 701/450; 707/792, 918–919, 944, 705
See application file for complete search history.

(56) References Cited

U.S. PATENT DOCUMENTS

| 7,486,958 | B2 * | 2/2009 | Sheha et al. | ............... | 455/456.3 |
| 8,166,013 | B2 | 4/2012 | Bandaru et al. | | |
| 8,239,130 | B1 * | 8/2012 | Upstill et al. | ................. | 701/426 |
| 2011/0047182 | A1 | 2/2011 | Shepherd et al. | | |
| 2011/0098922 | A1 | 4/2011 | Ibrahim | | |
| 2012/0036132 | A1 * | 2/2012 | Doyle | ........................... | 707/738 |
| 2012/0135756 | A1 * | 5/2012 | Rosso et al. | ............... | 455/456.3 |

* cited by examiner

*Primary Examiner* — Helal A Algahaim
*Assistant Examiner* — Nga X Nguyen
(74) *Attorney, Agent, or Firm* — McDermott Will & Emery LLP (57) ABSTRACT

Systems and methods for updating geographic information system are provided. Method includes receiving name and location of point of interest (POI). Method includes comparing name and location of received POI to names and locations of POIs stored in data repository. Method includes determining whether first POI in data repository has name that matches name of received POI, and location that is within predetermined distance of location of received POI. Method includes increasing or maintaining maximum confidence value for first POI if first POI has name that matches name of received POI, and location that is within predetermined distance of location of received POI. Method includes adding name and location of received POI to temporary set of points of interest if it is determined that no POI in data repository has name that matches name of received POI, and location that is within predetermined distance of location of received POI.

17 Claims, 9 Drawing Sheets

FIG. 3 ns include code to add the name and location of the received point of interest to a temporary set of points of interest if it is determined that no point of interest in the data repository has a name that matches the name of the received point of interest, and a location that is within a predetermined distance of the location of the received point of interest.

GEOGRAPHIC DATA UPDATE BASED ON USER INPUT

FIELD

The subject technology generally relates to data management and, in particular, relates to a system and method for geographic data update based on user input.

BACKGROUND

Internet-based data repositories that store geographic information about points of interest, such as businesses, are well-known. Oftentimes, old businesses close, new businesses open, or existing businesses change their names or addresses. In such circumstances, the businesses typically do not notify the data repository that stores the geographic information about the change, thus rendering the information of the data repository inaccurate and obsolete. Due to the high rate of change in the names and locations of local businesses, an automated technique for updating geographic data stored on a data repository is desirable.

SUMMARY

The disclosed subject matter relates to a method for updating information contained in a geographic information system. The method includes receiving a name of a point of interest and a location associated with the point of interest. The method includes comparing the name and location of the received point of interest to the names and locations of a plurality of points of interest stored in a data repository. The method includes determining whether a first point of interest in the data repository has a name that matches the name of the received point of interest, and a location that is within a predetermined distance of the location of the received point of interest. The method includes increasing or maintaining a maximum confidence value for the first point of interest if the first point of interest has a name that matches the name of the received point of interest, and a location that is within a predetermined distance of the location of the received point of interest. The method includes adding the name and location of the received point of interest to a temporary set of points of interest if it is determined that no point of interest in the data repository has a name that matches the name of the received point of interest, and a location that is within a predetermined distance of the location of the received point of interest.

The disclosed subject matter further relates to a non-transitory computer-readable medium for updating information contained in a geographic information system. The computer-readable medium includes instructions. The instructions include code to receive a geographic check-in. The instructions include code to determine, based on the geographic check-in, a name of a point of interest and a location of the point of interest. The instructions include code to compare the name and location of the received point of interest to the names and locations of a plurality of points of interest stored in a data repository. The instructions include code to determine whether a first point of interest in the data repository has a name that matches the name of the received point of interest, and a location that is within a predetermined distance of the location of the received point of interest. The instructions include code to increase or maintain a maximum confidence value for the first point of interest if the first point of interest has a name that matches the name of the received point of interest, and a location that is within a predetermined distance of the location of the received point of interest. The instruc- The disclosed subject matter further relates to a processing system for updating information contained in a geographic information system. The system includes one or more processors. The system include a memory including instructions to be implemented by the one or more processors. The instructions include code to receive a name of a point of interest and a location of the point of interest, wherein the location associated with the point of interest comprises a latitude and a longitude. The instructions include code to compare the name and location of the received point of interest to the names and locations of a plurality of points of interest stored in a data repository. The instructions include code to determine whether a first point of interest in the data repository has a name that matches the name of the received point of interest, and a location that is within a predetermined distance of the location of the received point of interest. The instructions include code to increase or maintaining a maximum confidence value for the first point of interest if the first point of interest has a name that matches the name of the received point of interest, and a location that is within a predetermined distance of the location of the received point of interest. The instructions include code to add the name and location of the received point of interest to a temporary set of points of interest if it is determined that no point of interest in the data repository has a name that matches the name of the received point of interest, and a location that is within a predetermined distance of the location of the received point of interest.

It is understood that other configurations of the subject technology will become readily apparent to those skilled in the art from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The novel features of the subject technology are set forth in the appended claims. However, for purpose of explanation, several aspects of the disclosed subject matter are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

The subject technology relates to techniques for updating geographical information based on user input. In some implementations, a server receives, from a client computing device, a name of a point of interest and a location of the point of interest. The server also compares the name of the received point of interest and the location of the received point of interest to points of interest within a data repository of point of interest names and respective locations. The data repository comprises plural points of interest. The server also determines whether the name of the received point of interest corresponds to a name of a point of interest from the data repository and whether the location of the received point of interest corresponds to a location within a predetermined distance of a location of the point of interest from the data repository. The server also, in a case that the name of the received point of interest corresponds to the name of the point of interest from the data repository and the location of the received point of interest is within a predetermined distance of a location of the point of interest from the data repository: increases or maintains a maximum confidence value for the point of interest from the data repository. The server also, in a case that the name of the received point of interest does not correspond to the name of the point of interest from the data repository or the location of the received point of interest is not within a predetermined distance of a location of the point of interest from the data repository: adds the name of the received point of interest and the location of the received point of interest to a temporary set of points of interest, where either the received point of interest is added to the data repository in a case that the received point of interest is confirmed within a predetermined time or the received point of interest is removed from the temporary set of points of interest in a case where the received point of interest is not confirmed within the predetermined time.

As used herein, a first string may correspond to a second string, for example, if the first string exactly matches the second string (e.g., both the first string and the second string read "ABC Cafe") or if the first string is a misspelling of the second string (e.g., the first string has at most a certain number (e.g., three) of characters that are different from the second string). For example, the first string "ABC Caf" may correspond to the second string "ABC Cafe." A first string may also correspond to a second string if the first string is a synonym of the second string, as determined based on a synonym table. For example, "XYZ Bar," may correspond to "XYZ Tavern," if a synonym table lists the words "bar," and "tavern" as synonyms.

Figure 1:
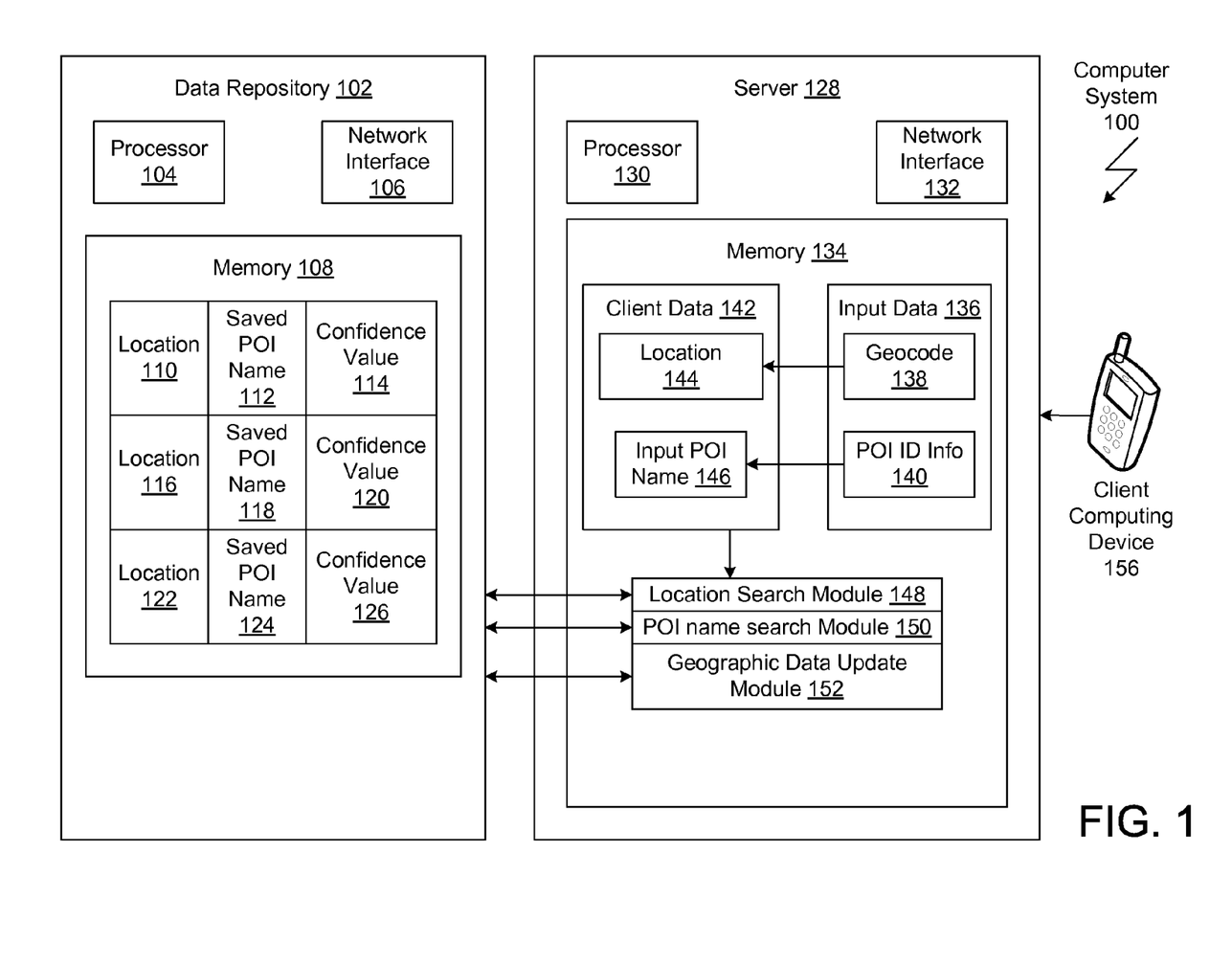
FIG. 1 illustrates an example of a computer system configured to implement a geographic data update based on user input.

FIG. 1 illustrates an example of a computer system 100 configured to implement a geographic data update based on user input. As shown, the computer system 100 includes a data repository 102, a server 128, and a client computing device 156.

As shown, the data repository 102 includes a processor 104, a network interface 106, and a memory 108. The processor 104 is configured to execute computer instructions that are stored in a computer-readable medium, such as the memory 108. The processor may be a central processing unit (CPU). The network interface 106 is configured to allow the data repository 102 to transmit and receive data in a network, such as the Internet, an intranet, a local area network or a cellular network. The network interface 106 may include one or more network interface cards (NICs). The memory 108 may be any device configured to store data and instructions, for example, a cache unit or a storage unit. As illustrated, the memory 108 stores a plurality of locations 110, 116, and 122. Each location 110, 116, and 122 is associated with a saved point of interest (POI) name 112, 118, and 124 and a confidence value 114, 120, and 126. While three locations 110, 116, and 122 are illustrated, the subject technology may be implemented in conjunction with any number of locations.

The location 110, 116 or 122 identifies a geographic location. The location 110, 116 or 122 may be represented as a latitude/longitude, a street address or any other identification of a geographic location. The location 110, 116 or 122 may also include an elevation value. Each location 110, 116 or 122 is associated with a saved POI name 112, 118 and 124. The saved POI name 112, 118 or 124 identifies a point of interest, such as a business, organization or park at the location. Example saved POI names 112, 118 or 124 include "ABC Coffee," "Golden Gate Park" or "San Francisco City Hall." While FIG. 1 shows each location 110, 116 or 122 to be associated with a single saved POI name 112, 118 or 124, a single location may generally be associated with multiple saved POI names. For example, two businesses may share an address or an address may be associated with both an airport terminal and a restaurant in the airport terminal. Also, some POI names may be associated with multiple locations. For example, a business may have branches at two or more addresses.

Each saved POI name 112, 118 or 124 may also be associated with a confidence value 114, 120 or 126. The confidence value 114, 120 or 126 indicates the likelihood that the saved POI 112, 118 or 124 is at the location 110, 116 or 122. In one example, the confidence value 114, 120 or 126 is an ordinal value bounded by a minimum and a maximum, for example, a real number between zero and one. For example, if multiple trusted users have verified that the point of interest associated with the saved POI name 112 exists at location 110, then the confidence value 114 for the saved POI name 112 may be close or equal to a maximum confidence value. However, if only one unverified or non-trusted user identified a saved POI name 118 at location 116, then the confidence value 120 for the saved POI name 118 may be low. A trusted user may be a user who is known to provide accurate information to the data repository 102, for example an employee associated with the data repository 102 or a member of a community dedicated to improving the quality of the data repository 102. A trusted user may be identified, for example, based on a username and password combination or based on information associated with the client computing device 156 of the trusted user, such as an IP address, a MAC address, or a cookie stored on the client computing device 156.

As shown, server 128 includes a processor 130, a network interface 132, and a memory 134. The server 128 and the data repository 102 may be communicatively coupled or configured to communicate with one another. The server 128 and the client computing device 156 may be communicatively coupled or configured to communicate with one another. The processor 130 is configured to execute computer instructions that are stored in a computer-readable medium, for example, the memory 134. The processor may be a central processing unit (CPU). The network interface 132 is configured to allow the server 128 to transmit and receive data in a network, such as the Internet, an intranet, a local area network or a cellular network. The network interface 132 may include one or more network interface cards (NICs).

The memory 134 is configured to store data and instructions and may include any device configured to store data and instructions, for example, a cache unit or a storage unit. As shown, the memory 134 can include an input data 136 derived from client data 142, a location search module 148, a POI name search module 150, and a geographic data update module 152.

The input data 136 can be received from client computing device 156. The client computing device 156 may transmit the input data 136 directly to the server 128. Alternatively, the input data 136 may be transmitted to a social networking server (not illustrated) or a location "check-in" server (not illustrated) and forwarded from the social networking server or the location "check-in" server to the server 128. In one example, a web crawler (not illustrated), with proper permission from a user of the client computing device 156 who provided the input, locates the input data 136 and transmits the input data 136 to the server 128. The server 128 may verify the timestamp of the input data 136 provided by the web crawler to make sure that the input data 136 is recent and not outdated. A user of client computing device 156 may opt out of having any of the data of the user forwarded to the server 128. Further, the user may opt out of having the web crawler transmit data posted by the user to the server 128. As illustrated, the input data 136 includes a geographic code (geocode) 138 and information identifying a POI (POI ID info) 140. The geographic code 138 may identify a location of the client computing device 156 where the input data 136 was entered. The geographic code 138 may be a representation of a geographic location created by the client computing device 156. For example, the geographic code 138 may include a latitude/longitude, a street address, an IP address, or WiFi or cell tower access data. The information identifying the POI 140 may include text, an image, a video recording or an audio recording. The additional information may include text or speech in a natural language, for example, the English language. The information identifying the POI 140 may include a status update in a social networking service.

The input data 136 can be in the form of or converted into client data 142. The client data 142 includes a location 144 and an input POI name 146. The location 144 may be represented as a latitude/longitude, a street address or any other identification of a geographic location, such as the locations 110, 116, and 122 stored on the data repository 102. The location 144 may also include an elevation value. The location 144 may be derived from the geographic code 138 or equivalent to geographic code 138, such as IP address information, WiFi access data, or cell tower data. Alternatively, the location 144 may be received directly from the client computing device 156 in the input data 136, rather than derived from the input data 136. The input POI name 146 may be a name of a point of interest associated with the location 144 provided by the user of the client computing device 156. The input POI name 146 may be derived from the information identifying the POI 140 in the input data 136. The input POI name 146 may be included in the additional information identifying the POI 140 in the input data 146 or derived based on that information.

In one example, the information identifying the POI 140 may directly identify the input POI name 146, which may be selected from several options presented to the user of the client computing device 156. In another example, the information identifying the POI 140 may include the text or the spoken words from which the input POI name 146 can be determined. In one implementation, the server 128 may determine the input POI name 146 from the information identifying the POI 140 based on a preposition of place, such as "at" or "in," followed by a noun phrase that indicates the input POI name 146. For example, by recognizing "at" in the phrase, "I am at Golden Gate Park," the input POI name 146 can be identified as "Golden Gate Park." The input POI name 146 may also be determined from the information identifying the POI 140 based on a verb indicative of a place, such as "visiting," "touring" or "travelling." For example, by recognizing "visiting" in the phrase, "I am visiting the Empire State Building," the input POI name 146 can be identified as the "Empire State Building."

Alternatively, the information identifying the POI 140 may include an image or a photograph that includes text, for example, a photograph of an "Oakland Airport Terminal 1" sign. The server 128 can use image-to-text conversion to determine the text of the sign and determine that the input POI name 146 should be "Oakland Airport Terminal 1."

In yet another example, the information identifying the POI 140 may include a photograph of an "AT&T Park" sign at a certain depth, representing a distance from the camera. The information identifying the POI 140 may further include camera direction information and depth-to-distance conversion information. The server 128 may then identify the input POI name 146 by applying image-to-text conversion to determine that the text of the sign is "AT&T Park." The location 144 may be determined by combining the geographic code 138 with the direction of the camera and the distance from the camera to the "AT&T Park" image, as determined based on the depth-to-distance conversion information of the camera. In other words, the location 144 may be determined by adding to the geographic code 138 a displacement vector having a direction of the camera direction and a magnitude of the distance between the camera and the "AT&T Park" image. Persons skilled in the art will recognize other techniques by which the location 144 and the input POI name 146 may be determined from the information received from the client computing device 156.

The location search module 148 is configured to search the data repository 102 for a location 110, 116, or 122 of a point of interest from the data repository 102 that is within a first threshold radius (e.g., 2 meters, 3 meters, 5 meters, or 10 meters, depending on the specific implementation) of the location 144 in the client data 142. A search using a radius of any size can be performed. Moreover, the search to identify a POI that matches the input POI name 146 can first look for POIs having a name that matches the input POI name, instead of a location within the search radius. Two POI names may match if they have a string edit distance that is less than a threshold or are word permutations of one another.

The POI name search module 150 is configured to search for a saved POI name 112, 118, or 124 from the data repository 102 that matches the input POI name 146 in the client data 142.

The geographic data update module 152 is configured to update geographic data stored in the data repository 102 based on the input data 136 received from a client computing device 156. One example of an operation of the geographic data update module 152 is described in conjunction with FIGS. 2A-2G below. While the geographic data update module 152 is illustrated here as a single module, one or more modules may implement all or a portion of the functions of the geographic data update module 152. In one example, each of the subroutines A-F described in conjunction with FIGS.

2A-2G is implemented in a separate module. In another example, a single module implements all of the steps in FIGS. 2A-2G.

Figure 2A:
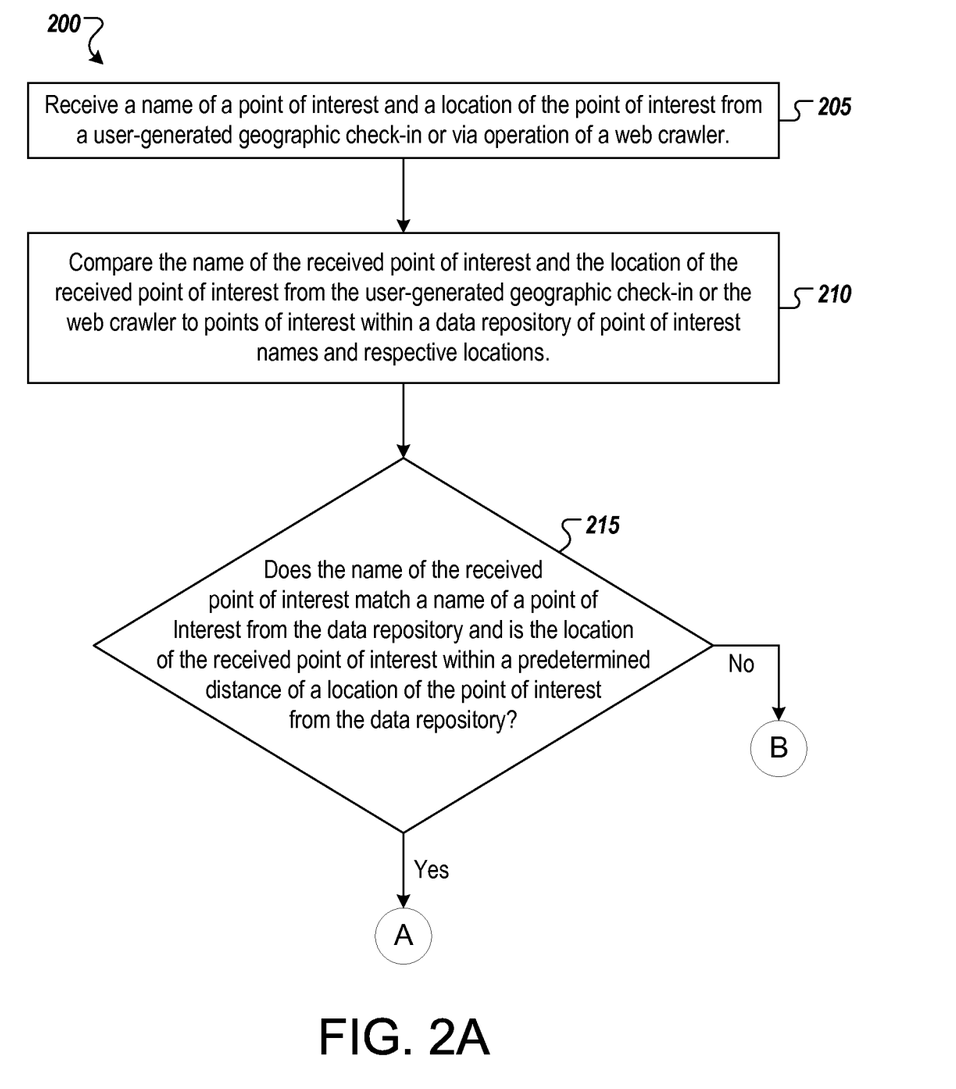
FIGS. 2A-2G illustrates an example process by which a geographic data update based on user input may be completed.

FIG. 2A illustrates an example process 200 by which a geographic data update based on user input may be completed.

The process 200 begins at step 205, where a server (e.g., the server 128, by operation of the geographic data update module 152) receives a name of a point of interest and a location of the point of interest from a user-generated geographic check-in or via operation of a web crawler.

The server may receive an input (e.g., directly from a client computing device or from another server, e.g., via the operation of a web crawler) that includes the name of the received point of interest and the location for the received point of interest. The location may be represented as a latitude/longitude, a street address, or any other representation of a geographic location. The input may be a post or status update to a social networking service that the user shared with the public or a geographic check-in that the user shared with the public. For example, the post may include the text or spoken word, "I am walking my dog in Central Park," coupled with a geographic tag. The name of the received point of interest, "Central Park" in the above example, may be determined based on the text or the spoken words in the post. Alternatively, the input may be a photograph with a geographic tag. The photograph may include an indication of a point of interest (e.g., a "DEF Restaurant" sign). The name of the received point of interest may be determined based on text within the photograph. The text may be determined using image-to-text conversion techniques. The location may be determined based on a geographic tag in the input. The server may receive the user-generated geographic check-in in real-time (e.g., within two hours, one hour, ten minutes, five minutes, one minute etc., depending on the processing speed of the server or the network) after the geographic check-in is entered by the user. Alternatively, the geographic check-in may be transmitted to the server by operation of a web crawler several days, weeks, or months after the geographic check-in was generated.

In one example, a user of a client computing device may provide the input directly to the server. The user may download, from a geographic check-in server, a keyhole markup language (KML) feed including one or more of his/her geographic check-ins and provide this feed to the server (e.g., server 128). The server may provide, to the user's client computing device, a map with geographic locations visited by the user overlaying the map. The map may indicate (e.g., highlight) places where there is a difference between a point of interest name indicated by the user and a point of interest name stored in the data repository and/or ask the user to verify a name of a point of interest visited by the user. The user may provide and/or confirm the information received by the server from the KML feed provided by the user. The user may also inform the server that multiple points of interest are located at the same geographic location (e.g., a food court may include both ABC Café and DEF Restaurant at the same geographic location, or GHI Bookstore may be located within San Francisco Airport, i.e., GHI Bookstore may include a subset of the geographic points covered by San Francisco Airport, and a specified geographic point may be associated with both GHI Bookstore and San Francisco Airport).

In one example aspect, the user may manually upload the KML feed to the server. Alternatively, the user may authorize the server to automatically access KML feeds of the user's geographic check-in data. The server may not access the user's geographic check-in data without receiving affirmative permission from the user to access the data.

The server may compare the data in the KML feed and the data stored in the data repository. If the KML feed includes data that corresponds to data from the data repository, confidence values associated with data from the data repository may be increased. If the KML feed includes data that does not correspond to data from the data repository, confidence values associated with the relevant points of interest from the data repository may be decreased. The server may then have the user that provided the data and/or a trusted user verify the data whether the data in the KML feed or the data from the data repository is correct. The subject technology is described above in conjunction with a KML feed. However, any other data structure for representing geographic information may be used in place of the KML feed.

In another example, a geographic check-in service may be associated with the server, and the server may ask (e.g., via electronic messages transmitted to a mobile phone or to an electronic messaging address) users of the geographic check-in service to verify the point of interest names associated with their check-ins and whether the server may use the data provided by the users to update the data repository. In one aspect, a user may provide permission to the server to send messages to him/her. In another aspect, a user may opt-out of receiving messages from the server.

In step 210, the server compares the name of the received point of interest and the location of the received point of interest from the user-generated geographic check-in or the web crawler to a data repository (e.g., data repository 102) of point of interest names and respective locations. The data repository includes representations of multiple points of interest.

In step 215, the server determines (i) whether the name of the received point of interest matches a name of a point of interest from the data repository and (ii) whether the location of the received point of interest is within a predetermined distance (e.g., 2 meters, 3 meters, 5 meters, or 10 meters, depending on the specific implementation) of a location of the point of interest from the data repository. In some aspects, a location may be represented by location data, for example, latitude/longitude coordinates, map cells, addresses (including, for example, one or more of zip codes, cities, street addresses, etc.). If (i) and (ii) are true, the process 200 continues to subroutine A, described in conjunction with FIG. 2B, below. If either (i) or (ii) is false, the process 200 continues to subroutine B, described in conjunction with FIG. 2C, below.

In one example, the server may check the spelling of the user or search for points of interest having similar spelling to the data in the input. For example, if the input includes the words "I am having tea at ABC Caf with Steve," the server may recognize that the input includes a misspelling of "ABC Café." The server may determine that the misspelled point of interest name "ABC Caf" matches the stored point of interest name "ABC Café" from the data repository.

As used herein, two POI names may match if the two POI names are within a certain string-edit distance (e.g., three or fewer different characters) from one another, words within the POI names that do not exactly match one another are found in a synonym table, or the words in the first POI name are a permutation of the words in the second POI name. For example, "AT&T Park," and "ATT Park" can be considered matches because (i) the string edit distance between them is small enough (one character), or (ii) "ATT" and "AT&T" are found to be synonyms in a synonym table. Similarly, "XYZ Bar" and "XYZ Tavern" can be considered matches because "bar" and "tavern" are found to be synonyms in a synonym table. Also, "XYZ Bar" and "Bar XYZ" can be considered matches because "XYZ Bar" is a permutation of the words in "Bar XYZ."

The predetermined distance may be determined depending on the specific implementation or based on a type associated with the POI. For example, a POI such as a suburban or rural supermarket or department store and its associated parking lot may occupy a 50 meter by 50 meter space, so a predetermined distance of 35 meters may be used. However, a POI such as a coffee house or deli in a big city (e.g., San Francisco, Calif. or Washington, D.C.) may occupy a 5 meter by 5 meter space, so a predetermined distance of 3.5 meters may be used.

In some examples, a geographic region corresponding to a point of interest may be used in place of a predetermined distance from a center point of the point of interest. The geographic region may be a circular region having a center point and a preset radius. Alternatively, the geographic region may be a rectangular region (e.g., a suburban restaurant may occupy a rectangular building). The geographic region may correspond to rectangular prism associated with a length parallel to the ground, a width parallel to the ground, a minimum elevation, and a maximum elevation (e.g., an office of a law firm may occupy floors 17-20 of a tower in Chicago, Ill.). Alternatively, the geographic region may correspond to any geographic region that is not necessarily a circle, a rectangle, or a rectangular prism. For example, an airport, a shopping mall, or a park may have a substantially arbitrary shape.

Figure 2B:
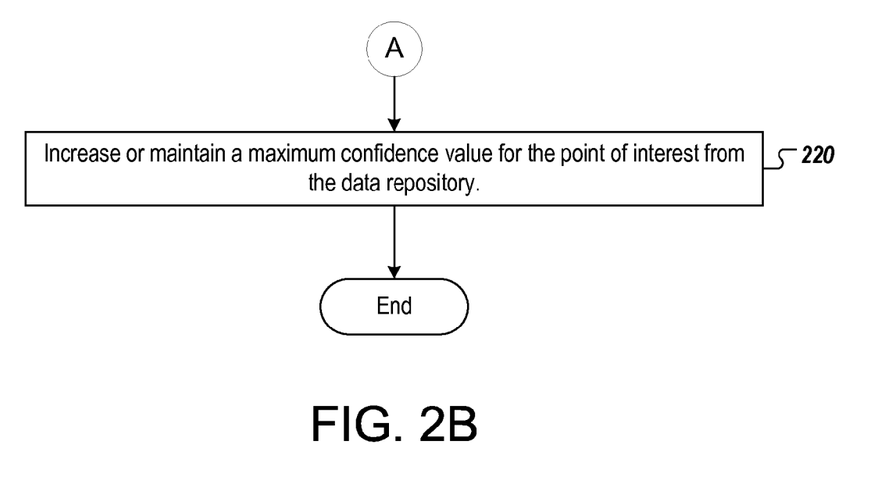

FIG. 2B illustrates subroutine A of the process 200, which is implemented if (i) the name of the received point of interest matches the name of a point of interest from the data repository and (ii) the location of the received point of interest is within the predetermined distance of the location corresponding to the point of interest from the data repository.

The subroutine A begins at step 220, where the server increases or maintains a maximum confidence value for the point of interest from the data repository. One or more points of interest from the data repository may be associated with a confidence value. The confidence value may vary between a minimum level (e.g., 0) and a maximum level (e.g., 1). Increasing the confidence value may include increasing the confidence value by a preset increase threshold (e.g., 0.1). Decreasing the confidence value may include decreasing the confidence value by a preset decrease threshold (e.g., 0.15). The server may increase the confidence value of a point of interest from the data repository upon receiving an input (e.g., a geographic check-in) verifying that a point of interest having the stored point of interest name exists at the stored location for the point of interest. After step 220, the process 200 ends.

Figure 2C:
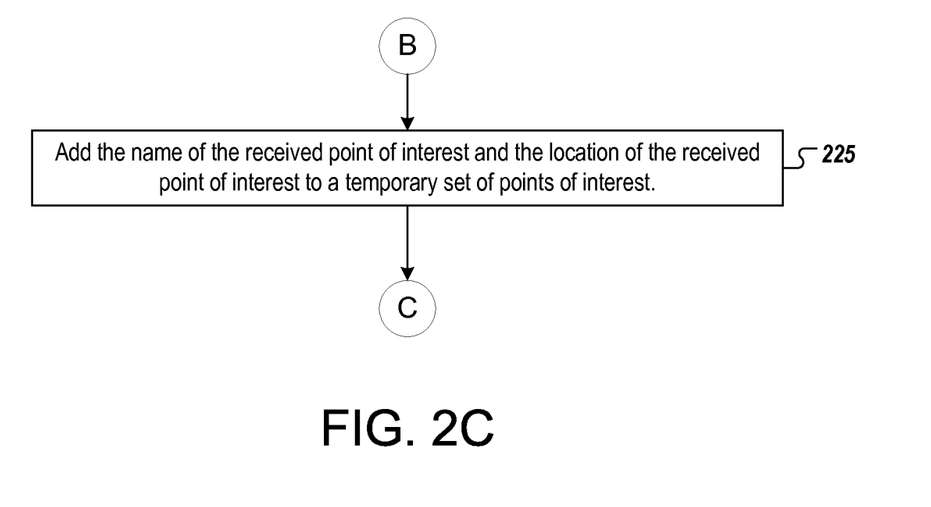

FIG. 2C illustrates subroutine B of the process 200, which is implemented if (i) the name of the received point of interest does not match the name of the point of interest from the data repository or (ii) the location of the received point of interest does not match the location corresponding to the point of interest from the data repository.

The received point of interest may not match the point of interest from the data repository under (i) or (ii) above for any of a number of reasons. For example, the received point of interest may be new (e.g., a new business), may have moved locations, or may refer to a business at the same location whose name has changed.

The subroutine B begins at step 225, where the server adds the name of the received point of interest and the location of the received point of interest to a temporary set of points of interest. The temporary set of points of interest may be stored separately from the data in the data repository, for example, in a memory of the server. After step 225, the process 200 continues to subroutine C, described in conjunction with FIG. 2D.

Figure 2D:
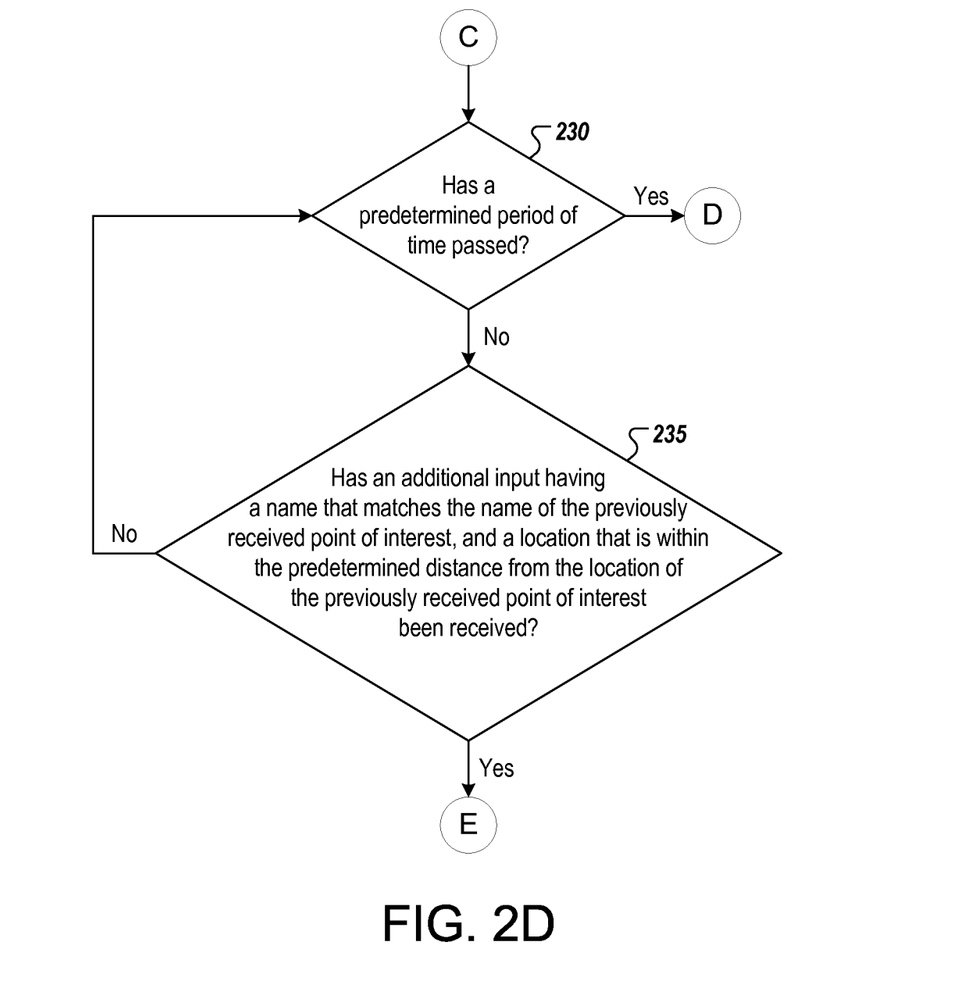

FIG. 2D illustrates subroutine C of the process 200, which is implemented after the name of the received point of interest and the location of the received point of interest have been added to the temporary set of points of interest.

The subroutine C begins at step 230, where the server determines whether a predetermined period of time (e.g., one week, one month, or three months) has passed since the received point of interest was added to the temporary set of points of interest. If a predetermined period of time has not passed, the subroutine C continues to step 235. If a predetermined period of time has passed, the subroutine C invokes subroutine D, described in conjunction with FIG. 2E.

In step 235, the server determines whether an additional input has been received having a name that matches the name of the previously received point of interest, and a location that is within the predetermined distance from the location of the previously received point of interest. The additional input may be, for example, an additional geographic check-in at the received point of interest. If not, the subroutine C returns to step 230. If so, the subroutine C invokes subroutine E, described in conjunction with FIG. 2F.

Figure 2E:
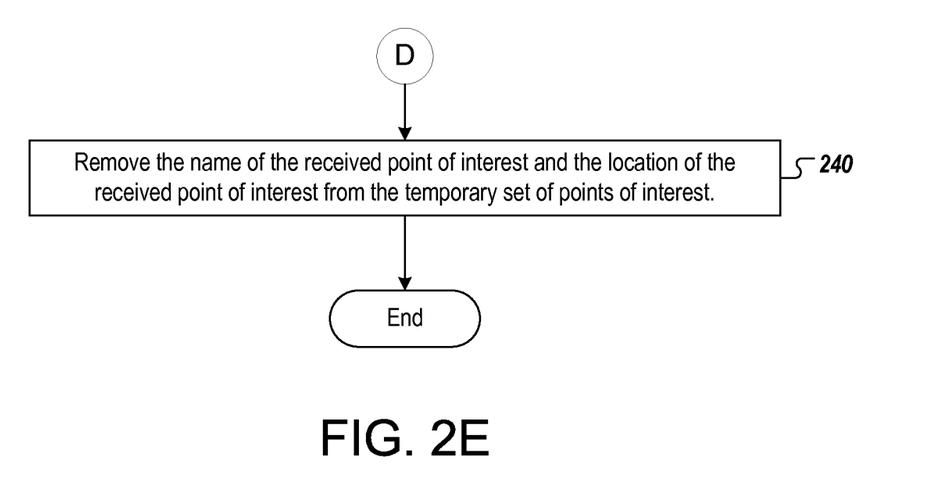

FIG. 2E illustrates subroutine D of the process 200, which is implemented if the predetermined time has passed since the received point of interest was added to the temporary set of points of interest. In such circumstances, it is likely that received point of interest was identified at the associated location by error or mistake. For example, a person may have written a post to a social network about ABC Café, while he/she was at his/her home, and the server may have incorrectly determined that the post was written at ABC Café. The post may state, for example, "I will be studying at ABC Café this afternoon."

The subroutine D begins at step 240, where the server removes the name of the received point of interest and the location of the received point of interest from the temporary set of points of interest. After step 240, the process 200 ends.

Figure 2F:
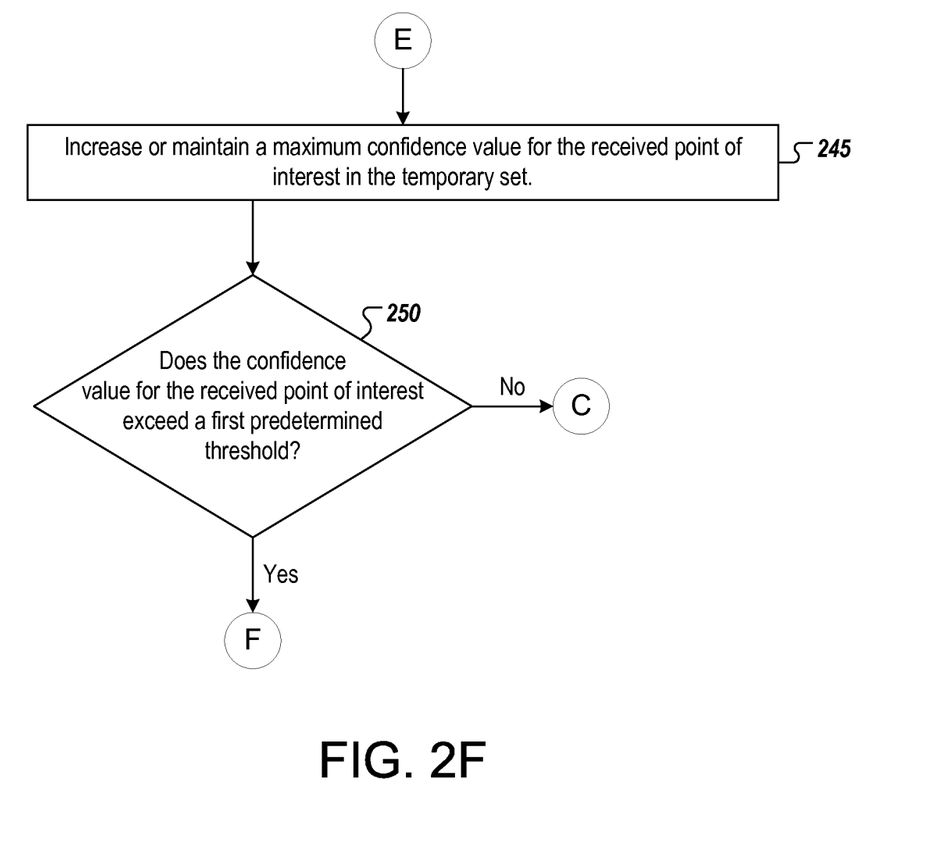

FIG. 2F illustrates subroutine E of the process 200, which is implemented if an additional input is received within the predetermined period of time having a name that matches the name of the previously received point of interest and a location that is within the predetermined distance from the location of the previously received point of interest. In such circumstances, it is more likely that a point of interest having the name of the received point of interest exists at the corresponding geographic location (as multiple different geographic check-ins confirm this information), and a confidence level associated with the point of interest can therefore be increased.

The subroutine E begins at step 245, where the server increases or maintains a maximum confidence value for the received point of interest in the temporary set.

In step 250, the server determines whether the confidence value for the received point of interest exceeds a first predetermined confidence threshold (e.g., 0.7 if the confidence value varies between a minimum level of 0 and a maximum level of 1). If so, the subroutine E invokes subroutine F, described in conjunction with FIG. 2G. If not, the process 200 returns to the beginning of the subroutine C (step 230). For example, the subroutine E may invoke the subroutine C or the subroutine C may include a loop that returns to the beginning of the subroutine C (step 230) upon determining that the confidence value for the received point of interest does not exceed the first predetermined threshold in step 250.

Figure 2G:
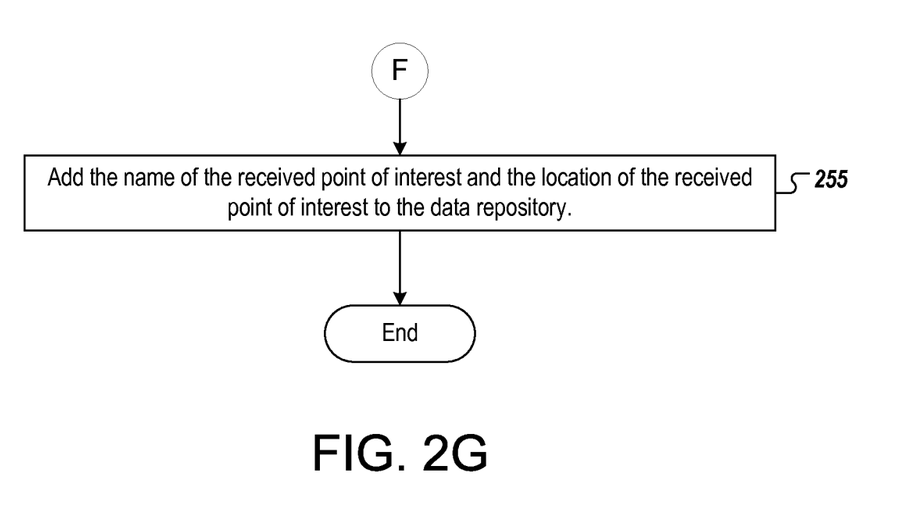

FIG. 2G illustrates subroutine F of the process 200, which is implemented if the confidence value for the received point of interest exceeds the first predetermined confidence threshold. In such circumstances, it is highly likely that a point of interest having the name of the received point of interest exists at the associated geographic location, and as a result, the point of interest may be added to the POI data repository.

The subroutine F begins at step 255, where the server adds the name of the received point of interest and the location of the received point of interest to the data repository. The server may also decrease (e.g., by a preset amount, e.g., 0.1) the confidence value of any other points of interest from the data repository having a geographic location that is the same as the geographic location of the received point of interest, as it may be unlikely that two points of interest are in the same geographic location. Alternatively, the confidence value of such points of interest may be reduced only when/if the confidence value of the received point of interest reaches a second and higher predetermined confidence threshold.

In one example, the server may request that a trusted user (e.g., an employee of a business associated with the server) verify a name of a point of interest associated with a location in the data repository when the confidence value of the point of interest falls below a preset confidence threshold (e.g., 0.3). The server may receive a response from the trusted user and update the data repository accordingly.

In another example, if the confidence value for the point of interest from the data repository falls below the present confidence threshold (e.g., 0.3), the server may remove that point of interest from the data repository. In such circumstances, it is likely that a point of interest having the name of the removed point of interest no longer exists at the formerly stored location for the removed point of interest.

In some examples, a single geographic location may be associated with a single point of interest. For example, a single story building in a suburb may include a single coffee house (e.g., ABC Café). In another example, a single geographic location may be associated with multiple points of interest. For example, ABC Café may exist within San Francisco Airport (i.e., ABC Café occupies a subset of the points occupied by San Francisco Airport). In yet another example, multiple points of interest may be associated with the same geographic region, i.e., a food court may include both ABC Café and DEF Restaurant. If multiple points of interest exist in the same location, geographic check-ins may be received for each of the multiple points of interest, resulting in high confidence values for all of the points of interest in the geographic location. However, if one point of interest replaces another at a specific geographic location (e.g., ABC Café renames itself DEF Restaurant or sells the business to DEF Restaurant), geographic check-ins listing the former point of interest name may cease and geographic check-ins listing the new point of interest name may be initiated, resulting in a higher confidence value for the new point of interest name and a lower confidence value for the former point of interest name. After step 255, the process 200 ends.

The process 200 describes one approach for using user-generated geographic check-ins or information obtained via a web crawler to update location(s) of point(s) of interests within a geographic information system. However, if appropriate permissions are provided by users creating geographic check-ins, geographic check-in data may also be used to update or obtain other information, for example, at which days or times a point of interest is most visited by members of a social network, whether users who check-in at a first point of interest are also likely to check-in at a second point of interest (e.g., someone who visits ABC Cafe is more likely to also visit DEF Bookstore than someone who does not visit ABC Cafe), etc.

Figure 3:
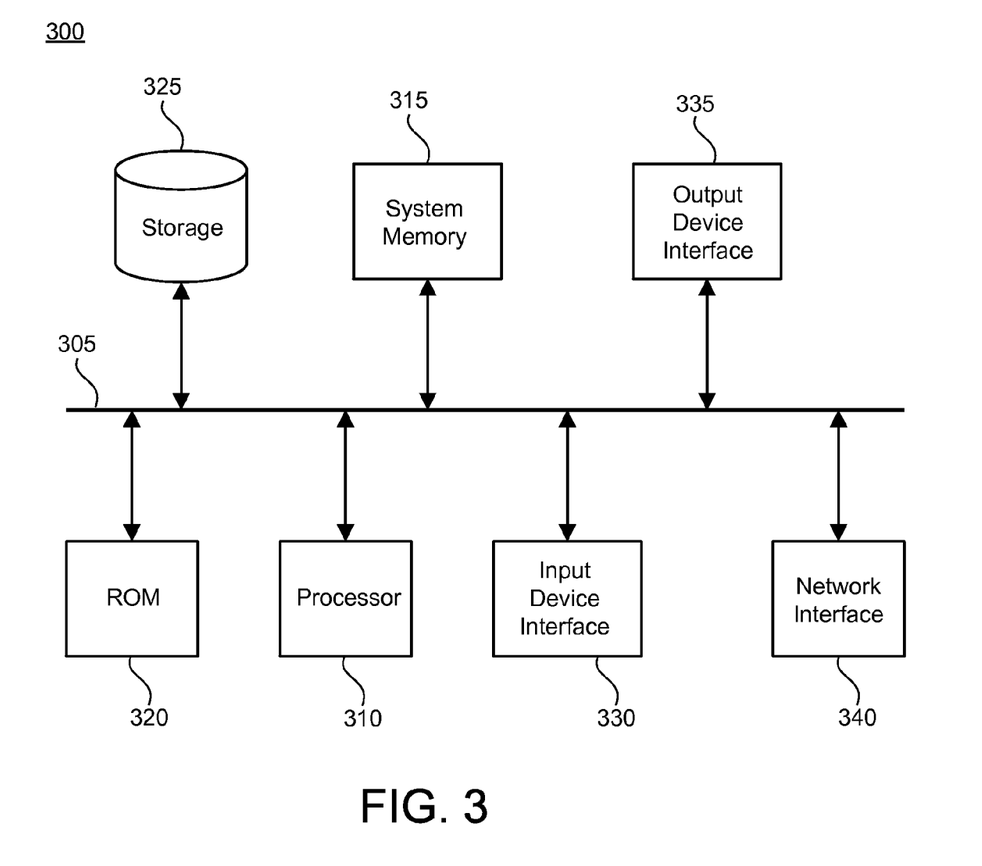
FIG. 3 conceptually illustrates an example electronic system with which some implementations of the subject technology are implemented.

FIG. 3 conceptually illustrates an electronic system 300 with which some implementations of the subject technology are implemented. For example, one or more of the data repository 102, the server 128, or the client computing device 156 may be implemented using the arrangement of the electronic system 300. The electronic system 300 can be a computer (e.g., a mobile phone, PDA), or any other sort of electronic device. Such an electronic system includes various types of computer readable media and interfaces for various other types of computer readable media. Electronic system 300 includes a bus 305, processing unit(s) 310, a system memory 315, a read-only memory 320, a permanent storage device 325, an input device interface 330, an output device interface 335, and a network interface 340.

The bus 305 collectively represents all system, peripheral, and chipset buses that communicatively connect the numerous internal devices of the electronic system 300. For instance, the bus 305 communicatively connects the processing unit(s) 310 with the read-only memory 320, the system memory 315, and the permanent storage device 325.

From these various memory units, the processing unit(s) 310 retrieves instructions to execute and data to process in order to execute the processes of the subject technology. The processing unit(s) can be a single processor or a multi-core processor in different implementations.

The read-only-memory (ROM) 320 stores static data and instructions that are needed by the processing unit(s) 310 and other modules of the electronic system. The permanent storage device 325, on the other hand, is a read-and-write memory device. This device is a non-volatile memory unit that stores instructions and data even when the electronic system 300 is off. Some implementations of the subject technology use a mass-storage device (for example a magnetic or optical disk and its corresponding disk drive) as the permanent storage device 325.

Other implementations use a removable storage device (for example a floppy disk, flash drive, and its corresponding disk drive) as the permanent storage device 325. Like the permanent storage device 325, the system memory 315 is a read-and-write memory device. However, unlike storage device 325, the system memory 315 is a volatile read-and-write memory, such a random access memory. The system memory 315 stores some of the instructions and data that the processor needs at runtime. In some implementations, the processes of the subject technology are stored in the system memory 315, the permanent storage device 325, or the read-only memory 320. For example, the various memory units include instructions for updating geographic data based on user input in accordance with some implementations. From these various memory units, the processing unit(s) 310 retrieves instructions to execute and data to process in order to execute the processes of some implementations.

The bus 305 also connects to the input and output device interfaces 330 and 335. The input device interface 330 enables the user to communicate information and select commands to the electronic system. Input devices used with input device interface 330 include, for example, alphanumeric keyboards and pointing devices (also called "cursor control devices"). Output device interfaces 335 enables, for example, the display of images generated by the electronic system 300. Output devices used with output device interface 335 include, for example, printers and display devices, for example cathode ray tubes (CRT) or liquid crystal displays (LCD). Some implementations include devices for example a touchscreen that functions as both input and output devices.

Finally, as shown in FIG. 3, bus 305 also couples electronic system 300 to a network (not shown) through a network interface 340. In this manner, the electronic system 300 can be a part of a network of computers (for example a local area network ("LAN"), a wide area network ("WAN"), or an Intranet, or a network of networks, for example the Internet. Any or all components of electronic system 300 can be used in conjunction with the subject technology.

The above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some aspects of the disclosed subject matter, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase, for example, an "aspect" does not imply that the aspect is essential to the subject technology or that the aspect applies to all configurations of the subject technology. A disclosure relating to an aspect may apply to all configurations, or one or more configurations. A phrase, for example, an aspect may refer to one or more aspects and vice versa. A phrase, for example, a "configuration" does not imply that such configuration is essential to the subject technology or that such configuration applies to all configurations of the subject technology. A disclosure relating to a configuration may apply to all configurations, or one or more configurations. A phrase, for example, a configuration may refer to one or more configurations and vice versa.

What is claimed is:

1. A computer-implemented method for updating information contained in a geographic information system, the method comprising:

receiving, at one or more processors and from a client computing device, a name of a point of interest and a location associated with the point of interest;

comparing, at the one or more processors, the name and location of the received point of interest to names and locations of a plurality of points of interest stored in a data repository;

determining, at the one or more processors, whether a first point of interest in the data repository has a name that matches the name of the received point of interest, and a location that is within a predetermined distance of the location of the received point of interest;

increasing a confidence value for the first point of interest or verifying that the confidence value for the first point of interest is at a maximum if the first point of interest has a name that matches the name of the received point of interest, and a location that is within a predetermined distance of the location of the received point of interest; and adding the name and location of the received point of interest to a temporary set of points of interest, stored in the memory if it is determined that no point of interest in the data repository has a name that matches the name of the received point of interest, and a location that is within a predetermined distance of the location of the received point of interest; and when it is determined that the first point of interest in the data repository has a name that matches the name of the received point of interest, and a location that is within a predetermined distance of the location of the received point of interest:

determining whether a second point of interest in the data repository has a location that is within a predetermined distance of the location of the received point of interest, but a name that does not match the name of the received point of interest;

determining whether the confidence value associated with the first point of interest exceeds a second predetermined threshold; and reducing the confidence value of the second point of interest if the confidence value of the first point of interest exceeds the second predetermined threshold.

2. The method of claim 1, wherein when it is determined that no point of interest in the data repository has both a name that matches the name of the received point of interest, and a location that is within a predetermined distance of the location of the received point of interest, the method further comprising:

confirming that the received point of interest is located at the received location;

removing the name and location of the received point of interest from the temporary set of points of interest; and adding the name and location of the received point of interest to the data repository.

3. The method of claim 2, wherein confirming that the received point of interest is located at the received location comprises receiving a message, from a trusted user, confirming the name of the received point of interest and the location of the received point of interest.

4. The method of claim 2, wherein confirming that the received point of interest is located at the received location comprises:

receiving a subsequent input comprising a name that matches the name of the received point of interest and a location that is within a predetermined distance of the location of the received point of interest;

increasing the confidence value associated with the received point of interest in the temporary set of points of interest in response to the subsequent input;

determining that the increased confidence value associated with the received point of interest exceeds a first predetermined threshold; and confirming that the received point of interest is located at the received location based on the increased confidence value associated with the received point of interest exceeding the first predetermined threshold.

5. The method of claim 1, further comprising:
requesting a trusted user to verify a name and location corresponding to the second point of interest in the data repository when the confidence value of the second point of interest falls below a preset threshold.

6. The method of claim 1, wherein the location associated with the received point of interest comprises a latitude and longitude.

7. The method of claim 1, wherein receiving the name of the point of interest and the location of the point of interest comprises:
receiving a geographic check-in via a client computing device; and
determining the name of the point of interest and the location of the point of interest based on the geographic check-in.

8. The method of claim 7, wherein the geographic check-in comprises a photograph.

9. A non-transitory computer-readable medium encoded with instructions for updating information contained in a geographic information system, the instructions comprising code for:
receiving, from a client computing device, a geographic check-in;
determining, based on the geographic check-in received from the client computing device, a received name of a point of interest and a received location of the point of interest;
comparing the name and location of the received point of interest to names and locations of a plurality of points of interest stored in a data repository;
determining whether a first point of interest in the data repository has a name that matches the name of the received point of interest, and a location that is within a predetermined distance of the location of the received point of interest;
increasing a confidence value for the first point of interest or verifying that the confidence value for the first point of interest is at a maximum if the first point of interest has a name that matches the name of the received point of interest, and a location that is within a predetermined distance of the location of the received point of interest; and
upon determining that no point of interest in the data repository has both a name that matches the name of the received point of interest, and a location that is within a predetermined distance of the location of the received point of interest:
adding the name and location of the received point of interest to a temporary set of points of interest;
confirming that the received point of interest is located at the received location, wherein confirming that the received point of interest is located at the received location comprises:
receiving a subsequent input comprising a name that matches the name of the received point of interest and a location that is within a predetermined distance of the location of the received point of interest,
increasing the confidence value associated with the received point of interest in response to the subsequent input, and
determining that the received point of interest is located at the received location once the confidence value associated with the received point of interest exceeds a first predetermined threshold;
removing the name and location of the received point of interest from the temporary set of points of interest; and
adding the name and location of the received point of interest to the data repository.

10. The computer-readable medium of claim 9, wherein confirming that the received point of interest is located at the received location comprises:
receiving a message, from a trusted user, confirming the name of the received point of interest and the location of the received point of interest.

11. The non-transitory computer-readable medium of claim 9, wherein the location of the received point of interest comprises a latitude and longitude.

12. The non-transitory computer-readable medium of claim 9, wherein the geographic check-in comprises a photograph.

13. The non-transitory computer-readable medium of claim 9, wherein the geographic check-in comprises text.

14. A processing system for updating information contained in a geographic information system, the processing system comprising:
one or more processors; and
a memory comprising instructions which, when executed by the one or more processors, cause the one or more processors to:
receive, from a client computing device, a name of a point of interest and a location of the point of interest, wherein the location associated with the point of interest comprises a latitude and a longitude;
compare the name and location of the received point of interest to names and locations of a plurality of points of interest stored in a data repository;
determine whether a first point of interest in the data repository has a name that matches the name of the received point of interest, and a location that is within a predetermined distance of the location of the received point of interest;
increase a confidence value for the first point of interest or verify that the confidence value for the first point of interest is at a maximum if the first point of interest has a name that matches the name of the received point of interest, and a location that is within a predetermined distance of the location of the received point of interest; and
add the name and location of the received point of interest to a temporary set of points of interest if it is determined that no point of interest in the data repository has a name that matches the name of the received point of interest, and a location that is within a predetermined distance of the location of the received point of interest; and
when it is determined that the first point of interest in the data repository has a name that matches the name of the received point of interest, and a location that is within a predetermined distance of the location of the received point of interest:
determine whether a second point of interest in the data repository has a location that is within a predetermined distance of the location of the received point of interest, but a name that does not match the name of the received point of interest;

determine whether the confidence value associated with the first point of interest exceeds a second predetermined threshold; and reduce the confidence value of the second point of interest if the confidence value of the first point of interest exceeds the second predetermined threshold.

15. The processing system of claim 14, wherein a geographic check-in comprises the name of the received point of interest and the location of the received point of interest.

16. The processing system of claim 14, wherein the memory further comprises instructions which, when executed by one or more processors, cause the one or more processors to:

determine that no point of interest in the data repository has both a name that matches the name of the received point of interest, and a location that is within a predetermined distance of the location of the received point of interest;

confirm that the received point of interest is located at the received location;

remove the name and location of the received point of interest from the temporary set of points of interest; and add the name and location of the received point of interest to the data repository.

17. The processing system of claim 16, wherein instructions to confirm that the received point of interest is located at the received location comprise instructions to receive a message, from a trusted user, confirming the name of the received point of interest and the location of the received point of interest.

* * * * *